United States Patent [19]
Sumiya et al.

[11] Patent Number: 4,722,251
[45] Date of Patent: Feb. 2, 1988

[54] HYDRAULIC CIRCUIT FOR CONTROLLING AN AUTOMATIC TRANSMISSION

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Aisin-Warner Kabushiki Kaisha; Toyota Jidosha Kabushiki Kaisha, both of Aichi, Japan

[21] Appl. No.: 846,043

[22] Filed: Mar. 31, 1986

[30] Foreign Application Priority Data

Jul. 31, 1985 [JP] Japan ................. 60-169190
Feb. 8, 1986 [JP] Japan ................. 61-26451

[51] Int. Cl.⁴ .................. B60K 41/16; B60K 41/18
[52] U.S. Cl. ..................................... 74/868; 74/867
[58] Field of Search ................... 74/867, 868, 869

[56] References Cited

U.S. PATENT DOCUMENTS

| | | | |
|---|---|---|---|
| 2,923,175 | 2/1960 | Perkins | 74/740 |
| 3,000,230 | 9/1961 | Froslie | 74/869 |
| 3,296,884 | 1/1967 | Leonard | 74/869 X |
| 3,501,979 | 3/1970 | Forster et al. | 74/869 |
| 3,621,737 | 11/1971 | Vozumi | 74/868 |
| 3,656,372 | 4/1972 | Chana | 74/868 |
| 3,724,292 | 4/1973 | Borman | 74/869 |
| 3,752,011 | 8/1973 | Casey et al. | 74/866 |
| 3,752,015 | 8/1973 | Murakami | 74/869 |
| 3,842,693 | 10/1974 | Oberpichler | 74/868 |
| 3,952,614 | 4/1976 | Iijima | 74/868 |
| 3,956,947 | 5/1976 | Leising et al. | 74/866 |
| 4,021,712 | 5/1977 | Ishihara et al. | 74/866 |
| 4,034,628 | 7/1977 | Sakai et al. | 74/869 |
| 4,106,369 | 8/1978 | Taga | 74/868 X |
| 4,155,277 | 5/1979 | Minami et al. | 74/866 |
| 4,253,553 | 3/1981 | Yamada et al. | 74/869 |
| 4,274,303 | 6/1981 | Iwanaga et al. | 74/869 |
| 4,274,307 | 6/1981 | Iwanaga et al. | 74/869 |
| 4,314,488 | 2/1982 | Lauren | 74/869 X |
| 4,324,153 | 4/1982 | Sugimoto et al. | 74/866 |
| 4,324,321 | 4/1982 | Ushijima et al. | 192/13.12 |
| 4,334,441 | 6/1982 | Iwanaga et al. | 74/869 |
| 4,349,088 | 9/1982 | Ito et al. | 192/3.3 |
| 4,360,092 | 11/1982 | Muller et al. | 192/13 R |
| 4,367,528 | 1/1983 | Kawamoto et al. | 74/866 X |
| 4,367,812 | 1/1983 | Kobayashi et al. | 192/3.3 |
| 4,393,467 | 7/1983 | Miki et al. | 74/866 X |
| 4,406,181 | 9/1983 | Kubo et al. | 74/869 |
| 4,411,174 | 10/1983 | Yokoi et al. | 74/866 |
| 4,432,255 | 2/1984 | Borman et al. | 74/868 |
| 4,445,401 | 5/1984 | Ishimura | 74/868 X |
| 4,485,695 | 12/1984 | Kawamoto | 74/868 |
| 4,494,640 | 1/1985 | Honig | 74/868 |
| 4,497,222 | 2/1985 | Nagaoka et al. | 74/869 |
| 4,512,212 | 4/1985 | Ishikawa | 74/733 X |
| 4,527,678 | 7/1985 | Pierce et al. | 74/866 |
| 4,532,829 | 8/1985 | Sugano | 74/869 |
| 4,555,964 | 12/1985 | Jugano | 74/865 |
| 4,563,918 | 1/1986 | Sugano | 74/869 |
| 4,570,511 | 2/1986 | Nishimura et al. | 74/868 |
| 4,573,375 | 3/1986 | Hamada et al. | 74/867 |
| 4,576,062 | 3/1986 | Reppert et al. | 74/740 |
| 4,580,466 | 4/1986 | Iwanaga | 74/869 |
| 4,588,059 | 5/1986 | Miki et al. | 192/3.31 X |
| 4,598,612 | 7/1986 | Ideta | 74/869 X |
| 4,602,529 | 7/1986 | Sugano | 74/869 |
| 4,617,841 | 10/1986 | Sugano | 74/864 X |

FOREIGN PATENT DOCUMENTS

| | | | |
|---|---|---|---|
| 123041 | 9/1980 | Japan | 74/869 |
| 37140 | 3/1981 | Japan . | |
| 183147 | 10/1984 | Japan . | |
| 231059 | 11/1985 | Japan | 74/866 |
| 237256 | 11/1985 | Japan | 74/866 |

*Primary Examiner*—Leslie Braun
*Assistant Examiner*—D. Wright
*Attorney, Agent, or Firm*—Wenderoth, Lind & Ponack

[57] ABSTRACT

An oil pass for communicating a hydraulic servo a change-over valve is provided with an orifice and a by-pass disposed parallel to one another. The by-pass is provided with a sequence valve. When the hydraulic servo is subjected to less than a predetermined pressure, the sequence valve communicates to the change-over valve and the hydraulic servo through the by-pass, and when the hydraulic servo is subjected to a pressure that is higher than the predetermined pressure, the sequence valve is cut off.

5 Claims, 17 Drawing Figures

FIG.9

| position | | solenoid valve | | | | | clutch | | | brake | | | | OWC | | |
|---|---|---|---|---|---|---|---|---|---|---|---|---|---|---|---|---|
| | | $S_1$ | $S_2$ | $S_3$ | $S_L$ | $S_D$ | $C_0$ | $C_1$ | $C_2$ | $B_0$ | $B_1$ | $B_2$ | $B_3$ | $F_0$ | $F_1$ | $F_2$ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| D | 2nd | × | ○ | ○ | ◎ | ※ | ○ | ○ | × | × | ○ | × | × | × | × | ⊗ |
| D | 3rd | ○ | ○ | × | ◎ | ※ | ○ | ○ | × | × | × | ○ | × | ○ | ⊗ | × |
| D | 4th | ○ | ○ | ○ | ◎ | × | × | ○ | × | ○ | × | ○ | × | × | ⊗ | × |
| D | 5th | ○ | × | × | ◎ | × | ○ | ○ | ○ | × | × | ○ | × | ○ | × | × |
| D | 6th | ○ | × | ○ | ◎ | × | × | ○ | ○ | ○ | × | ○ | × | × | × | × |
| D | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| S | 2nd | × | ○ | ○ | ◎ | ※ | ○ | ○ | × | × | ○ | × | × | × | × | ⊗ |
| S | 3rd | ○ | ○ | × | ◎ | ※ | ○ | ○ | × | × | ○ | ○ | × | ○ | ○ | × |
| S | 4th | ○ | ○ | ○ | ◎ | × | × | ○ | × | ○ | ○ | ○ | × | × | ○ | × |
| S | 5th | ○ | × | × | ◎ | × | ○ | ○ | ○ | × | ○ | ○ | × | ○ | × | × |
| S | 6th | ○ | × | ○ | ◎ | × | × | ○ | ○ | ○ | ○ | ○ | × | × | × | × |
| S | (5th) | × | × | × | × | × | ○ | ○ | ○ | × | ○ | ○ | × | ○ | × | × |
| L | 1st | × | ○ | × | × | × | ○ | ○ | × | × | × | × | ○ | ○ | × | ○ |
| L | 2nd | × | ○ | ○ | ◎ | ※ | ○ | ○ | × | ○ | × | × | ○ | × | × | ○ |
| L | 3rd | ○ | ○ | × | ◎ | ※ | ○ | ○ | × | × | ○ | ○ | × | ○ | ○ | × |
| L | 4th | ○ | ○ | ○ | ◎ | × | × | ○ | × | ○ | ○ | ○ | × | × | ○ | × |
| L | (1st) | × | × | × | × | × | ○ | ○ | × | × | × | × | ○ | ○ | × | ○ | note:
| | | | |
|---|---|---|---|
| ○ | ON | engaged | locked |
| × | OFF | released | free |
| ◎ | ON L-UP ON / OFF L-UP OFF | — | — |
| ⊗ | — | — | free when coasting |
| ※ | actuated when sifting 2→3 | | |

2nd

3rd

HYDRAULIC CIRCUIT FOR CONTROLLING AN AUTOMATIC TRANSMISSION

BACKGROUND OF THE INVENTION

This invention relates to an automatic transmission of an automobile, particularly to a controlling hydraulic circuit preferably applicable to a control apparatus of a multistage automatic transmission comprising a main shifting unit and a sub-shifting unit, and more particularly to a control mechanism of a hydraulic servo for a friction engaging element.

Generally, an automatic transmission includes a torque converter and a planetary gear shift mechanism. The gear shift mechanism comprises an overdrive (O/D) planetary gear unit or underdrive (U/D) planetary unit, a front planetary gear unit and a rear planetary gear unit. The gear shift mechanism offers a four forward stages and one gear stage due to engagement or retainment of predetermined elements by clutches or brakes (friction engaging elements) controlled by a manual valve, two solenoid valves and three shift valves.

Heretofore, the aforementioned friction engaging element has been controlled by a hydraulic servo in which oil pressure is fed or drained according to a change-over operation of the manual valve and shift valve. Generally, the hydraulic servo is provided with an accumulator disposed in a parallel relation thereto. The engaging characteristics of the respective friction engaging elements are set according to a servo pressure of the hydraulic servo based on the setting hydraulic characteristics of the accumulator.

By the way, a piston of the hydraulic servo is required to move over a predetermined stroke until friction plates of the friction engaging elements contact with each other and a pressure, enough to bear a predetermined torque is realized. However, the stroke of the piston often causes a delay in the engagement of the friction engaging elements. In addition, a shifting shock arises due to gap of shifting time caused by the delay of engagement.

As a countermeasure to the shifting shock due to the delay of engagement, modified orifices, accumulator springs and accumulator pistons have been used. However, the modification of the orifices and accumulators often result in a sacrifice of the proper hydraulic characteristics.

On the other hand, as disclosed in a Japanese Laid-open patent application No. 57-37140, there has been proposed by the present applicant an automatic shift control apparatus for obtaining six forward stages of shifting, wherein three solenoid valves and three shifting valves are provided, an overdrive planetary gear unit functioning as a sub-shifting unit is used in combination with a main shifting unit comprising front and a rear planetary gear units.

By the way, the multistage automatic transmission comprising the sub-shifting unit and main shifting unit obtains six stages of shifting through a combination of two stages of the overdrive and direct connection of the sub-shifting unit and first speed, second speed and third speed of the main shifting unit. At this time, a situation occurs in which one of the shifting units is down-shifted while the other is up-shifted. For example, when kicked down, the sub-shifting unit is up shifted from the directly connecting state to the overdrive and a simultaneously the main shifting unit is down shifted from second speed to first speed, thus shifting from third speed to second speed in total. In the foregoing case, according to the conventional control apparatus, since no countermeasure is taken to complete both the shifting operations at the same time, there is the possibility that one of the shifting operations is effected first and then the other shifting operation is effected. For example, when the up-shifting operation is effected first, the transmission is first increased (to fourth speed) in speed extensively, and thereafter is decreased (to second speed) in speed extensively. On the other hand, when the down-shifting operation is effected first, the transmission is first decreased (to first speed) in speed extensively and thereafter increased in speed. Due to the foregoing, there occurs a kick-down which diminish the acceleration efficiency. In addition, there occurs a large shock which again poorly effects the shift feeling.

SUMMARY OF THE INVENTION

It is therefore an object of the present invention to provide a hydraulic circuit for controlling an automatic transmission, wherein oil pressure acts on the hydraulic servo with the most desirable hydraulic characteristics without modifying hydraulic devices such as accumulators in order to overcome the aforementioned problems inherent in the prior art.

Another object of the present invention is to provide a hydraulic circuit for controlling an automatic hydraulic transmission, wherein oil under pressure is promptly fed to a friction engaging element of one of the shifting units concurrently with when oil pressure is drained from a friction engaging element of the other shifting unit, and by effecting the shifting operations of both the units in synchronism, the problems inherent in the prior art are eliminated.

That is, according to the present invention, an oil pass for communicating the hydraulic servo to a shifting valve is provided with an orifice and a by-pass disposed in parallel. The by-pass is provided with a sequence valve. When the hydraulic servo is at less than a predetermined pressure, the sequence valve operates to communicate the shifting valve to the hydraulic servo through the by-pass, and when the hydraulic servo is at more than a predetermined pressure, the sequence valve is cut off.

Further, according to the present invention, an oil pass for transferring oil pressure to a hydraulic servo of a predetermined friction engaging element of at least one of the shifting units is provided with an orifice and a by-pass disposed in parallel. The by-pass is provided with a sequence valve to be shifted by oil pressure acting on the hydraulic servo of the predetermined friction engaging element. The oil pressure is directly fed to the hydraulic servo of the predetermined friction engaging element through the by-pass until the predetermined friction engaging element starts engaging. When the oil pressure acting on the hydraulic servo of the predetermined friction engaging element reaches a pressure level that is high enough to start engagement of the element, the sequence valve is shifted, so that the pressure oil will be fed to the hydraulic servo of the predetermined friction engaging element through the orifice.

Due to the foregoing, according to the present invention, the sequence valve is operated to feed the pressurized oil directly to the hydraulic servo through the by-pass until the hydraulic servo reaches a predetermined pressure, and when the hydraulic servo reaches the predetermined pressure, the sequence valve is cut off so that the pressurized oil is fed to the hydraulic servo through the oil pass including the orifice. Accordingly, the friction engaging elements start contacting promptly to prevent a delay of engagement. Thereafter, the friction engaging elements are smoothly engaged to bear the torque according to the increase of the pressure oil through the orifice, thereby effectively preventing an engaging shock and eventually a shift shock.

Furthermore, a multistage shifting operation can be effected through combination of the respective shifting stages of the sub-shifting unit and the main shifting unit. Nevertheless, the pressurized oil can be promptly fed to the predetermined friction engaging element, so that both the shifting operations of the sub-shifting unit and the main shifting unit, particularly, the up-shifting operation of the sub-shifting unit and the down-shifting operation of the main shifting unit can be effected in synchronism. Accordingly, the transmission is not temporarily shifted to output an excessively increased or decreased speed during the shifting operations. Thus, the kick down operation can be effected smoothly to increase the acceleration efficiency. In addition, the shift shock is lessened so that a comfortable shift feeling is obtained. Moreover, since the sequence valve is shifted, when the predetermined friction engaging elements reach an initial pressure level which starts the contacting the predetermined engaging elements, the engaging operation of the friction engaging elements can be smoothly effected through the orifice. Thus, the engaging operation can be effected promptly without poorly effecting the shift feeling.

BRIEF DESCRIPTION OF THE DRAWINGS

FIG. 9 is an illustration showing the operating state of the respective devices in the respective positions;

DESCRIPTION OF THE PREFERRED EMBODIMENT

On preferred embodiment of the present invention will be described hereunder the reference to the accompanying drawings.

Figure 1:
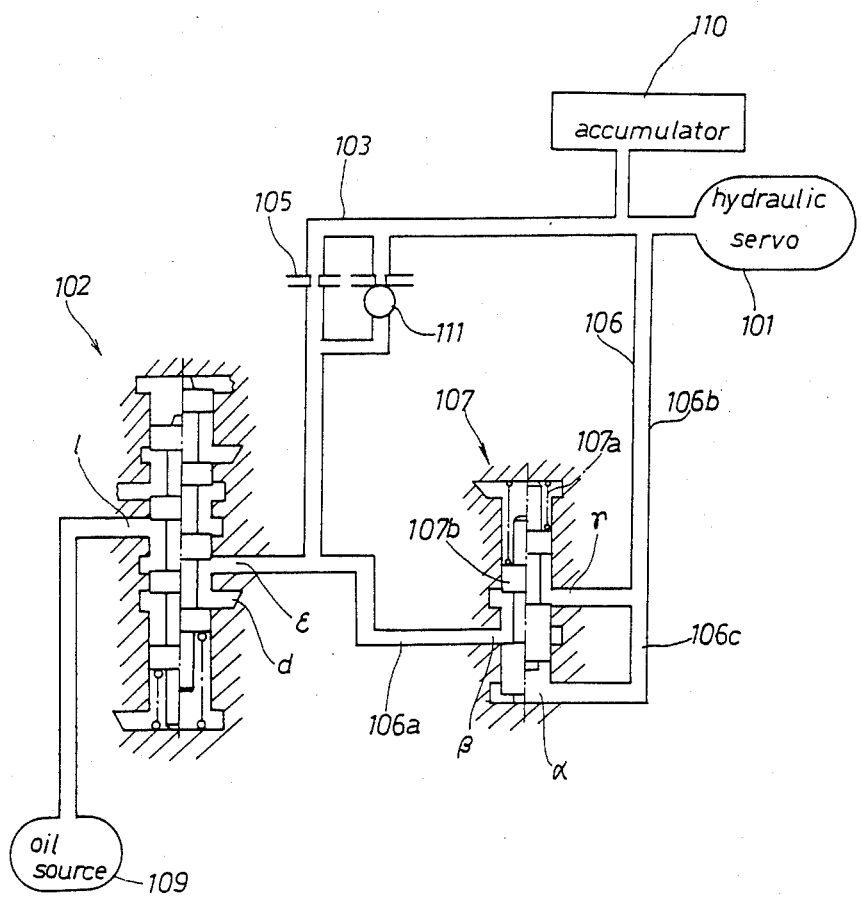
FIG. 1 is an illustration showing one embodiment of the present invention.

FIG. 1 illustrates one embodiment for repositioning a sequence valve 107 using feed back pressure from a hydraulic servo 101. That is, the sequence valve 107 includes a spring 107a set in accordance with characteristics of the hydraulic servo 101 and a control oil chamber $\alpha$ that is pressurized when lifting a spool 107b resisting the spring 107a. The control oil chamber $\alpha$ serves to communicate the hydraulic servo 101 and an accumulator 110 through a feed back pass 106c and a by-pass 106b. An oil pass 103 for communicating a shift valve 102 and the hydraulic servo 101 is provided with an orifice 105 having a smaller bore diameter than the by-pass 106 and a check valve 111 disposed in parallel with the orifice 105 and adapted to prevent flow from the shift valve 102 to the hydraulic servo 101 and to permit flow from the hydraulic servo 101 to the shift valve 102.

With the above-mentioned constitution of the present embodiment, when the pressure of oil of the hydraulic servo 101 is not high enough and the friction engaging elements are not engaged, the sequence valve 107 does not have its control oil chamber $\alpha$ fed with a servo pressure. Accordingly, the valve 107 is held in the left half position by the biasing force of the spring 197a, and a port $\beta$ is communicated with a port $\gamma$. In the foregoing state, when the shift valve 102 is shifted to the left half position to communicate a port l to a port $\epsilon$, the oil pressure (line pressure) from oil source 109 is passed through the ports l and $\epsilon$, via by-pass 106a, ports $\beta$ and $\gamma$, and by-pass 106b, and fed to the hydraulic servo 101 and accumulator 110. And, when the hydraulic servo 101 reaches a predetermined pressure which initiates engagement of the friction engaging elements, the pressure of the hydraulic servo 101 acts on the control oil chamber $\alpha$ through the feed back pass 106c to lift up a spool 107b resisting the spring 107a having a predetermined biasing force to cut off the ports $\beta$ and $\gamma$. Then, the oil pressure so far directly fed through the by-pass 106 is gradually fed to the hydraulic servo 101 and accumulator 110 through the oil pass 103 including the orifice 105. Due to the foregoing, the friction engaging elements are smoothly engaged without producing a delay of engagement or a shift shock. In the foregoing state, when the shift valve 102 is shifted to the right half position to communicate a port $\epsilon$ to a drain port d, firstly, the servo pressure of the hydraulic servo 101 is discharged to the drain port d through the check valve 111 of the oil pass 103. And, when the servo pressure of the hydraulic servo 101 reaches a predetermined pressure, the feed back pressure of the control oil chamber $\alpha$ is also reduced to reposition the sequence valve 107 to the left half position. Then, in addition to the quantity discharged through the check valve 111 of the oil pass 103, the servo pressure of the hydraulic servo 101 is drained through the by-pass 106. Due to the foregoing, the friction engaging elements are promptly and smoothly released.

Next, there will be described another embodiment with reference to FIG. 2, in which the sequence valve 107 is position controlled by a feed back pressure from the hydraulic servo and a throttle pressure from a throttle valve. The identical parts of the preceding embodiment will be designated by the identical reference numerals, and description will be omitted.

The sequence valve 107 is provided with a throttle pressure port $\eta$ fed with a throttle pressure from the throttle valve 112 through the oil pass 113. A spool 107b is formed with a step portion 107d, so that a pressure from the port $\eta$ will act in such a manner as to cope with the control oil chamber $\alpha$.

Accordingly, the spool 107b of the sequence valve 107 acts downward due to a biasing force exerted by the spring 107a and a force of the throttle pressure according to the opening of the throttle i.e. the output torque of an engine, which acts against feed back pressure from the hydraulic servo 101 acting on the control oil chamber α. Due to the foregoing, the sequence valve is held in the left half position and the pressure oil of the port ε is directly fed to the hydraulic servo 101 through the by-pass 106 and ports β and γ, until the hydraulic servo 101 reaches a predetermined pressure for the friction engaging elements which is a pressure large enough to bear a predetermined torque corresponding to the output of the engine. And, when the hydraulic servo 101 is subjected to a pressure that is higher than the predetermined pressure corresponding to the output of the engine, the sequence valve 107 is shifted to the right half position and cut off. Thereafter, the pressure oil is fed to the hydraulic servo 101 through only the oil pass 103 including the orifice 105. Similarly, when the hydraulic servo 101 is released, the oil pressure passes the check valve 111 of the oil pass 103 until a predetermined pressure is reached, and thereafter drained through the by-pass 106 and oil pass 103.

Figure 2:
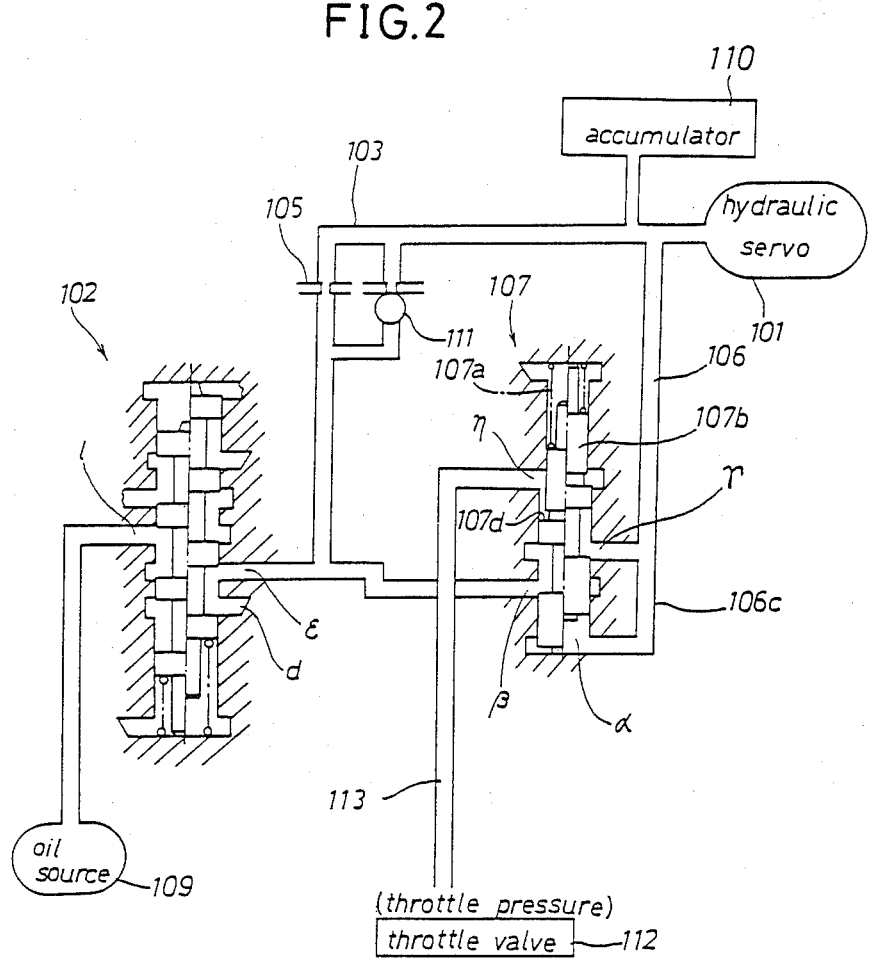
FIGS. 2 through 4 illustrate partly modified embodiments thereof.
Figure 3:
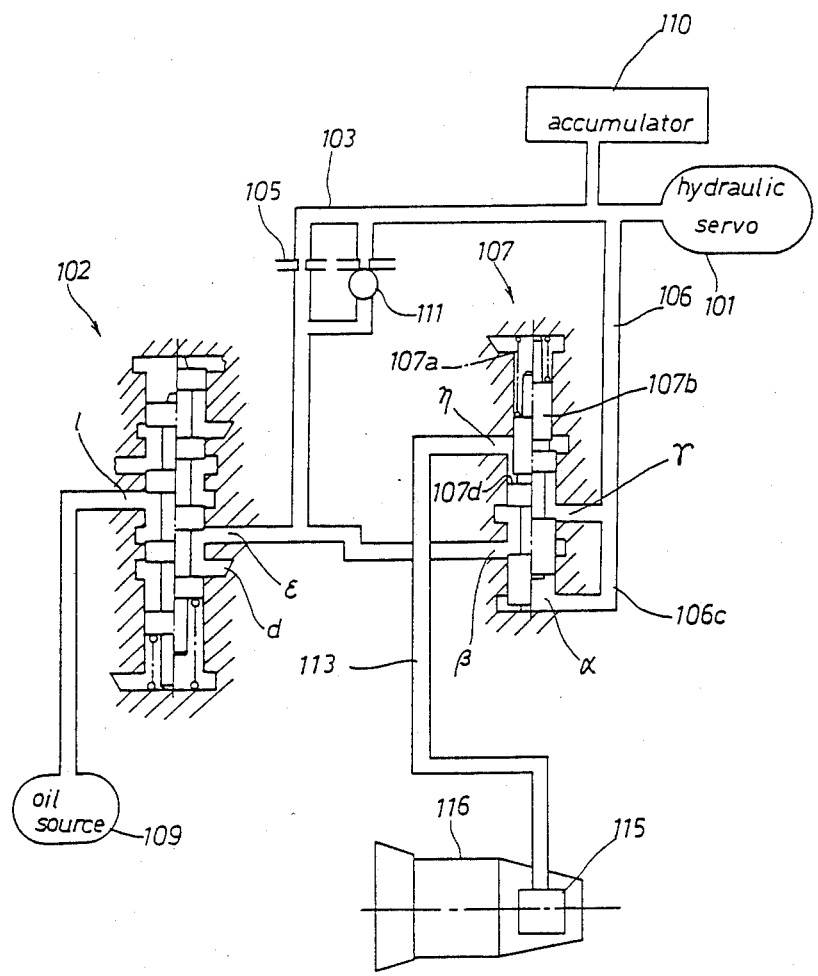

FIG. 3 illustrates another embodiment, in which the throttle valve employed in the embodiment of FIG. 2 is replaced with a governor valve 115. That is, the governor valve 115 is associated with and driven by a drive pinion of the automatic transmission 116 to obtain a governor pressure corresponding to a vehicle speed. The governor pressure is fed to the port η of the sequence valve 107 through the oil pass 113.

Consequently, according to this embodiment, in the sequence valve 107, the force based on the spring 107a and the governor pressure corresponding to vehicle speed acts against the feed back pressure from the hydraulic servo 101. Consequently, the hydraulic servo 101 is shifted by a predetermined pressure according to the vehicle speed.

Figure 4:
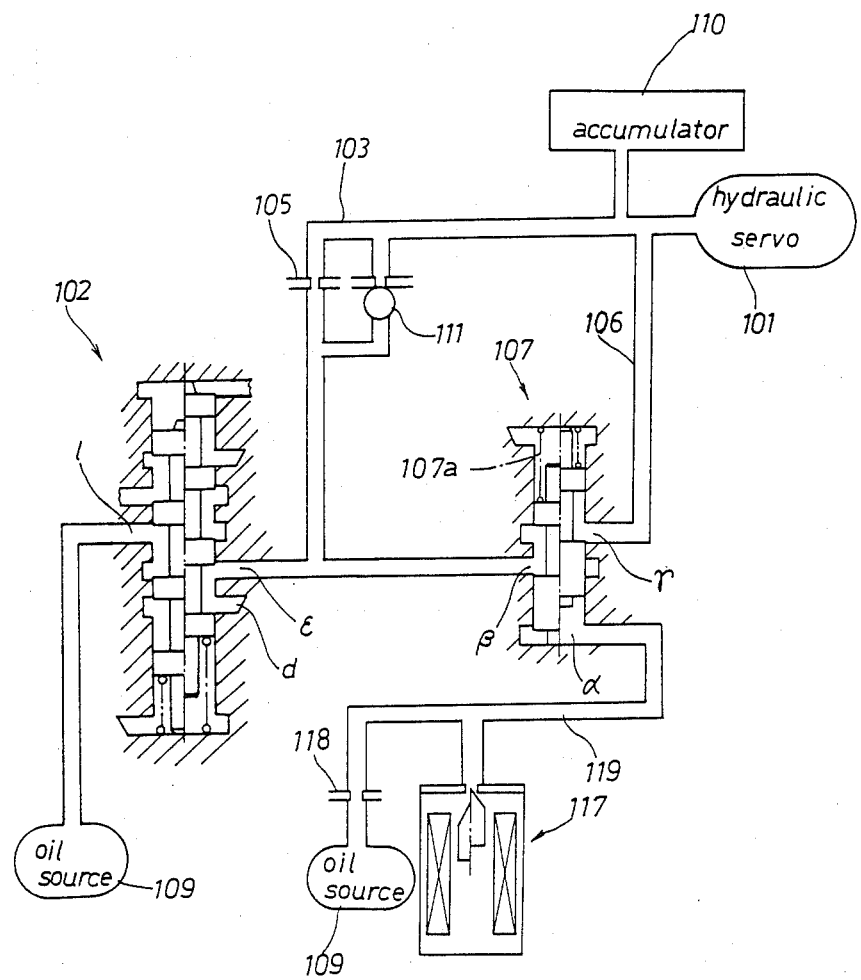

Next, there will be described another embodiment with reference to FIG. 4, in which the sequence valve 107 is shifted by a solenoid valve. Similarly, identical parts of the preceding embodiment will be designated by identical reference numerals in this embodiment, and description thereof will be omitted.

The sequence valve 107 includes a spring 107a and a control oil chamber 60 that is pressurized and which act against each other. The control oil chamber α communicates with the oil pass 119 extending from a solenoid valve 117. And, the solenoid valve 117 is on-off or duty controlled according to signals from a control part (not shown) to control the oil pressure acting on the control oil chamber α.

Consequently, according to this embodiment, the time when the solenoid valve 117 is controlled is adequately set according to characteristics of the hydraulic servo 101. However, when the solenoid valve 117 is on or duty controlled to cause oil pressure from an oil source 109 to act on the control oil chamber α through the orifice 118 and oil pass 119, the spool 107b of the sequence valve 107 is lifted resisting the spring 107a, to cut off the ports β and γ. Due to the foregoing, the by-pass 106 is cut off by a predetermined pressure according to characteristics of the hydraulic servo. Thereafter, the pressure oil is fed to the hydraulic servo 101 through the oil pass 103 including the orifice 105.

It is noted that the shift valve 102 employed in the embodiments shown in FIGS. 1 through 4 can be applied to any one of a 1-2 shift valve for shifting between first speed and second speed, 2-3 shift valve for shifting between second speed and third speed, and 3-4 shift valve for shifting between third speed and overdrive (O/D). In addition, it can of course be applied to other shift valves to be employed in a multistage transmission outputting more than four speed.

Next, there will be described another embodiment with reference to FIG. 5, in which a manual valve 2 manually operated by a driver is employed as a changeover valve.

Figure 5:
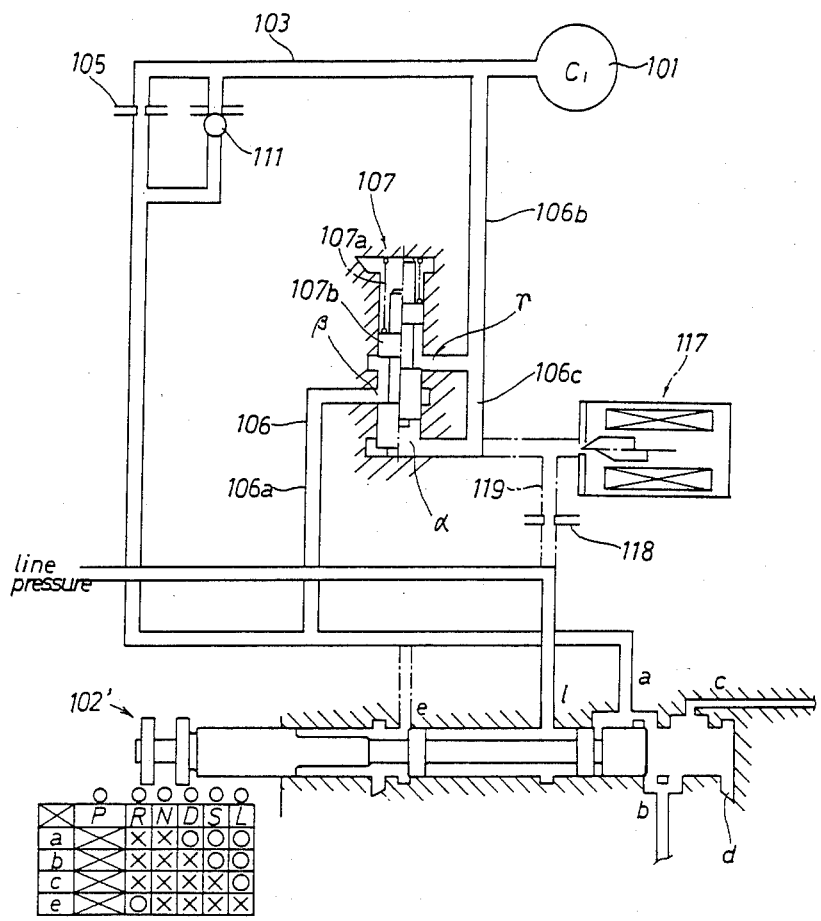
FIG. 5 is an illustration showing another embodiment of the present invention wherein a manual valve is incorporated.

The manual valve 102' has its ports a, b, c, and e communicated according to the respective shift positions P, R, N, D, S and L as shown in an operation table of FIG. 5. O denotes a communicating state with the line port l, and X denotes a draining state. The port a at D, S and L ranges communicates with a hydraulic servo 101 for a forward clutch $C_1$ through the oil pass 103. The oil pass 103 is provided with an orifice 105 and a check valve 111 disposed parallel to the orifice 105. Disposed in a parallel relationship with the oil pass 103 is a by-pass 106. The by-pass 106 is provided with a sequence valve 107. In the sequence valve 107, feed back pressure from the hydraulic servo 101 acts on the control oil chamber α through the oil pass 106c. The spring 107 coping with the oil chamber α is set such that it corresponds to a pressure for slidingly transmitting a predetermined torque after the $C_1$ clutch starts engaging.

Consequently, according to this embodiment, when the manual valve 102' is shifted from N (neutral) position to D range and the line pressure port l communicates with the port a, the line pressure is directly fed to the $C_1$ clutch hydraulic servo 101 through ports β and γ of sequence valve 107 held in the left half position by the biasing force of the spring 107a. Due to the foregoing, the clutch plates of clutch $C_1$ begin contacting. And, when the hydraulic servo 101 reaches a predetermined pressure, the feed back pressure in the control oil chamber α acts resist the spring 107a, and the sequence valve 107 is shifted to the right half position to cut off the ports β and γ, while throttling thereof. Thereafter, the line pressure of the port a is fed to the hydraulic servo 101 through the orifice 105 of the oil pass 103 to cause the clutch $C_1$ to engage smoothly. Due to the foregoing, when shifting from N to D, the $C_1$ (forward) clutch is smoothly engaged, thereby preventing an occurrence of a shift shock and preventing a shift time lag.

When the manual valve 102' is shifted from D range to N position to drain the port a, the pressure oil within the $C_1$ clutch hydraulic servo 101 is drained from the port a via the oil pass 103 and check valve 111. When the hydraulic servo 101 is subject to less than a predetermined pressure, the sequence valve 7 is shifted to the left half position. The pressurized oil within the hydraulic servo 101 now also flows through the by-pass 106 and is completely drained promptly. Due to the foregoing, a time lag at the time when shifting from D to N can be prevented. In addition, shifting operations such as from N to R (reverse), and from N to P (parking) can be promptly effected.

In the above embodiment, only a feed back pressure from the hydraulic servo 101 acts on the control oil chamber α of the sequence valve 107. Alternatively, the chamber α may of course be subjected to the throttle pressure as shown in FIG. 2 or with the governor pressure as shown in FIG. 3. Further, as shown by the one dot chain line in FIG. 5, the control oil chamber α may communicate with the solenoid valve 117 to be controlled by electric signals.

Furthermore, as shown the one dot chain line in FIG. 5, the port e may communicate with the oil pass 103 and the hydraulic servo 101 is replaced with the hydraulic servo for the friction engaging member $c_2$ actuated when the engine is in reverse, so that a possible occurrence of shift time lag and shift shock can be prevented when shifting from N to R as in the case when shifting from N to D.

Next, there will be described another embodiment with reference to FIG. 6, in which the present invention is applied to a multistage automatic transmission for obtaining six shifting stages through combination of a sub-shifting unit comprising two stages of an overdrive and direct connection, and a main shifting unit comprising three stages, namely first speed, second speed and third speed.

Oil paths $y_1$ and $z_1$ for feeding a pressure oil to a hydraulic servo $B_o$ (hereinafter referred simply as the "brake $B_o$", the same is applicable to other brakes and clutches) of an O/D brake of the sub-shifting unit is provided with by-passes $y_5$ and $z_5$ without an orifice 36 disposed parallel thereto. The by-passes are provided with a $B_o$ sequence valve 67. The sequence valve 67 has feed back pressure acting at its oil chamber $y_4$ from the O/D brake $B_o$. The feed back pressure acts against a spring 80 set to an initial operation pressure $P_o$ (see FIG. 10) that initiates contact of the brake plate of the brake $B_o$. Accordingly, when initially feeding oil pressure to the brake $B_o$, the line pressure in the oil path $z_5$ is directly fed to the brake $B_o$ through the ports $z_2$ and $y_3$, thereby reaching the initial operation pressure $P_o$ promptly. Then, the sequence valve 67 is shifted by the feed back pressure of the oil chamber $y_4$ to discommunicate the ports $z_2$ and $y_3$. Thereafter, the oil pressure is fed to the O/D brake $B_o$ through the orifice 36 and oil paths $z_1$ and $y_1$.

Figure 12:
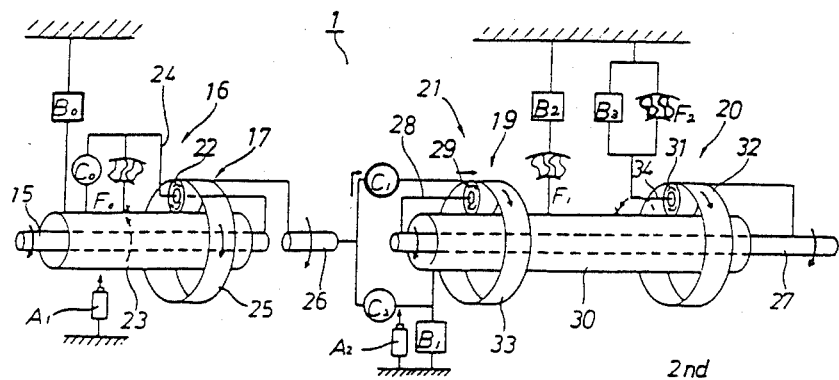
Figure 13:
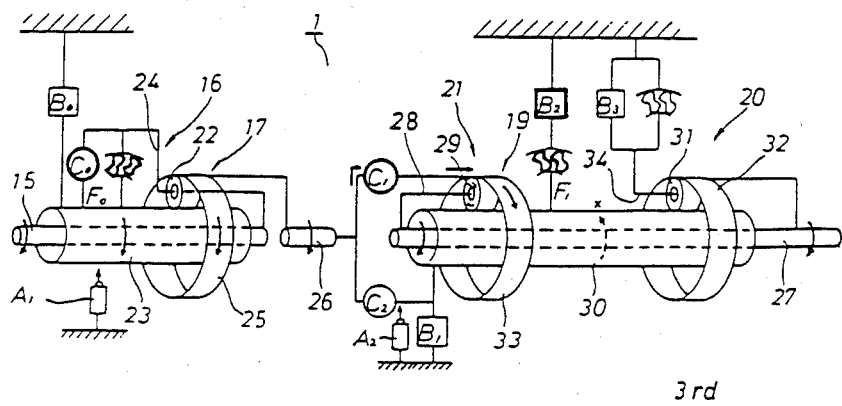

With the above constitution, when the transmission as a whole is down shifted from third speed to second speed, for example, the sub-shifting unit 16 is up shifted from direct to O/D upon engagement of the O/D brake $B_o$, and the main shifting unit 21 is down shifted from second speed to first speed upon release of the brake $B_2$ (see FIGS. 12 and 13). At this time, a third shift valve 53 is shifted to the left half position shown in FIG. 6 according by the solenoid $S_3$ that is turned on. The line pressure is fed to the by-pass $z_5$ from the line pressure port l through the port o. Further, the line pressure is directly fed to the O/D brake $B_o$ through the ports $z_2$ and $y_3$ of the sequence valve 67 held in the left half position and the oil pass $y_5$. Due to the foregoing, the brake $B_o$ promptly reaches the initial operation pressure $P_o$ which initiates contacting of the brake plate. The operation pressure $P_o$ acts on the oil chamber $y_4$ of the sequence valve 67 as a feed back pressure. Then, the valve 67 is shifted to cut off the ports $z_2$ and $y_3$. Thereafter, the line pressure of the port o is transferred to the port z of a $B_o$ release control valve 66 through the orifice 36 and oil pass $z_1$, to the port y through the valve 66 held in the left half position, and to the O/D brake $B_o$ from the oil pass $y_1$. As a result, the brake $B_o$ is smoothly engaged according to its engaging characteristics. Due to the foregoing, the O/D brake $B_o$ of the sub-shifting unit 16 is engaged in accordance with the releasing operation of the brake $B_2$ of the main shifting unit 21.

There will be described in detail another embodiment, in which the present invention is applied to a multistage automatic transmission.

Figure 7:
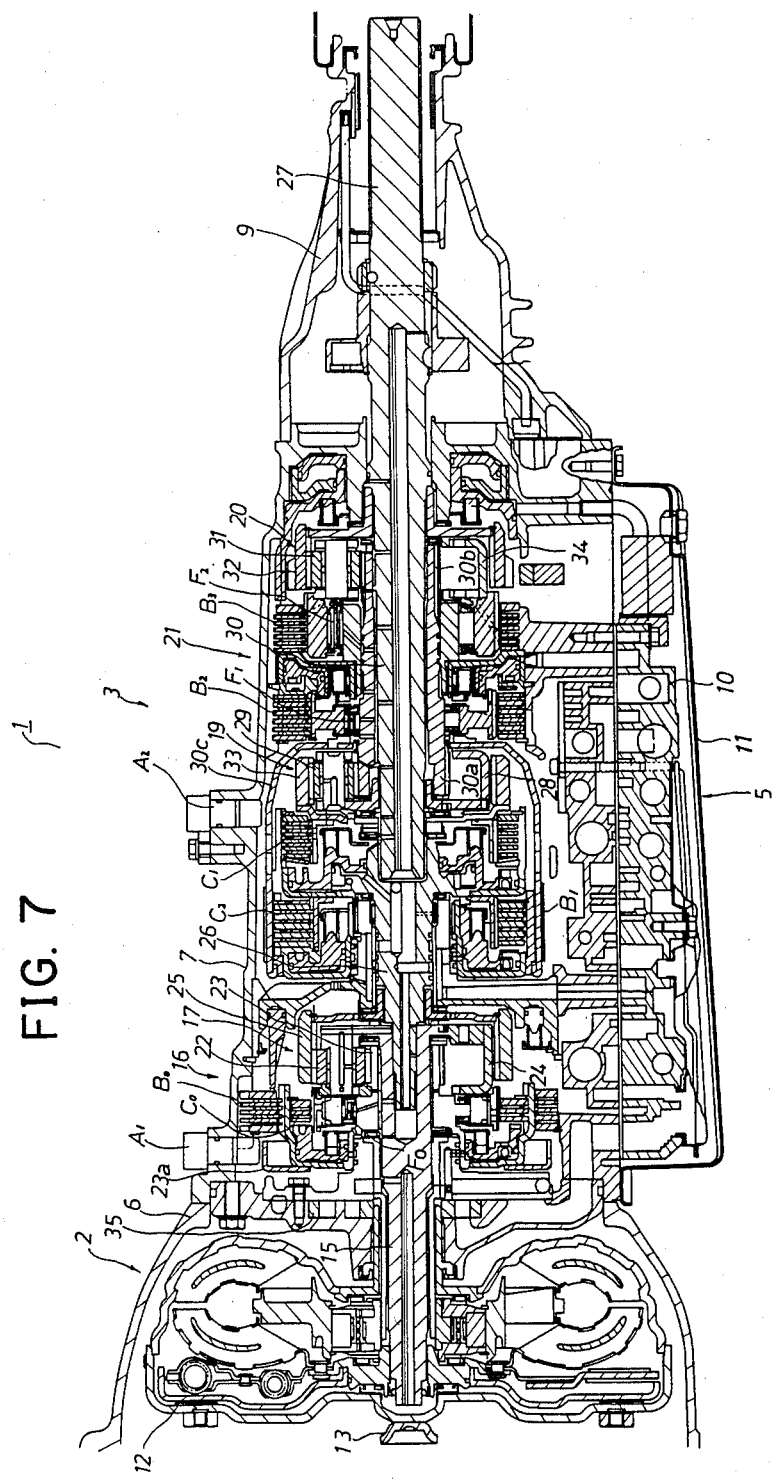
FIG. 7 is an overall sectional view showing a multistage automatic transmission.

The multistage automatic transmission 1, as shown in FIG. 7, includes a torque converter 2, a planetary shifting gear mechanism 3 and a hydraulic control mechanism 5, which are contained in a converter housing 6, a transmission case 7 and an extension housing 9, and a valve body 10 and an oil pan 11, respectively. The torque converter 2 includes a lock-up clutch 12. Rotation of the input member 13 is transmitted to an input shaft 15 of the shifting gear mechanism 3 through an oil flow of the torque converter 2 or directly by the lock-up clutch 12. The shifting gear mechanism 3 comprises a sub-shifting unit 16 including an overdrive (O/D) planetary gear unit 17 and a main shifting gear unit including a front planetary gear unit 19 and a rear planetary gear unit 20. The O/D planetary gear unit 17 comprises a carrier 24 directly connected to the input shaft 15 and supporting the planetary gear 22, a sun gear 23 mounted on the input shaft 15, and a ring gear 25 connected to the input shaft 26 of the main shifting unit 21. Interposed between the carrier 24 and the sun gear 23 are the O/D direct clutch $C_o$ and one-way clutch $F_o$. Interposed between the sun gear 23 and the case 7 is the O/D brake $B_o$. The front planetary gear unit 19 comprises a carrier 28 directly connected to the output shaft 27 and supporting the planetary gear 29, a sun gear $30a$ mounted on the output shaft 27 and integrally formed with the sun gear $30b$ of the rear planetary gear unit 20, and a ring gear 33 connected to the input shaft 26 through a forward cluch $C_1$. Interposed between the input shaft 26 and the sun gear 30 is a direct clutch $C_2$. Interposed between the sun gear 30 and the case 7 is a second coast brake $B_1$. Further, interposed between the sun gear 30 and the case 7 through a one-way clutch $F_1$ is a second brake $B_2$. The rear planetary gear unit 20 comprises a carrier 34 supporting the planetary gear 31, the sun gear $30b$ and a ring gear 32 directly connected to the output shaft 27. Between the carrier 34 and case 7, first and Rev brakes $B_3$ and a one-way clutch $F_2$ are disposed parallel to another. In FIG. 2, reference numeral 35 denotes an oil pump.

The case 7 of the O/D planetary gear unit 17 portion is provided with a rotary sensor $A_1$ comprising an optoelectric sensor or a magnetic sensor, etc. A flange piece $23a$ connected to the sun gear 23 is formed with cut-outs or holes at equal spaces. Accordingly, the rotary sensor $A_1$ detects the rotational speed of the sun gear 23, i.e. the shifting state of the sub-shifting unit 16. The case 7 of the front planetary gear unit 19 portion is also provided with a rotary sensor $A_2$. Similarly, a clutch connecting piece $30c$ extending from the sun gear 30 is formed with cut-outs or holes at equal spaces. Accordingly, the rotary sensor $A_2$ detects the rotational speed of the sun gear 30, i.e. the shifting state of the main shifting unit 21.

Figure 8:
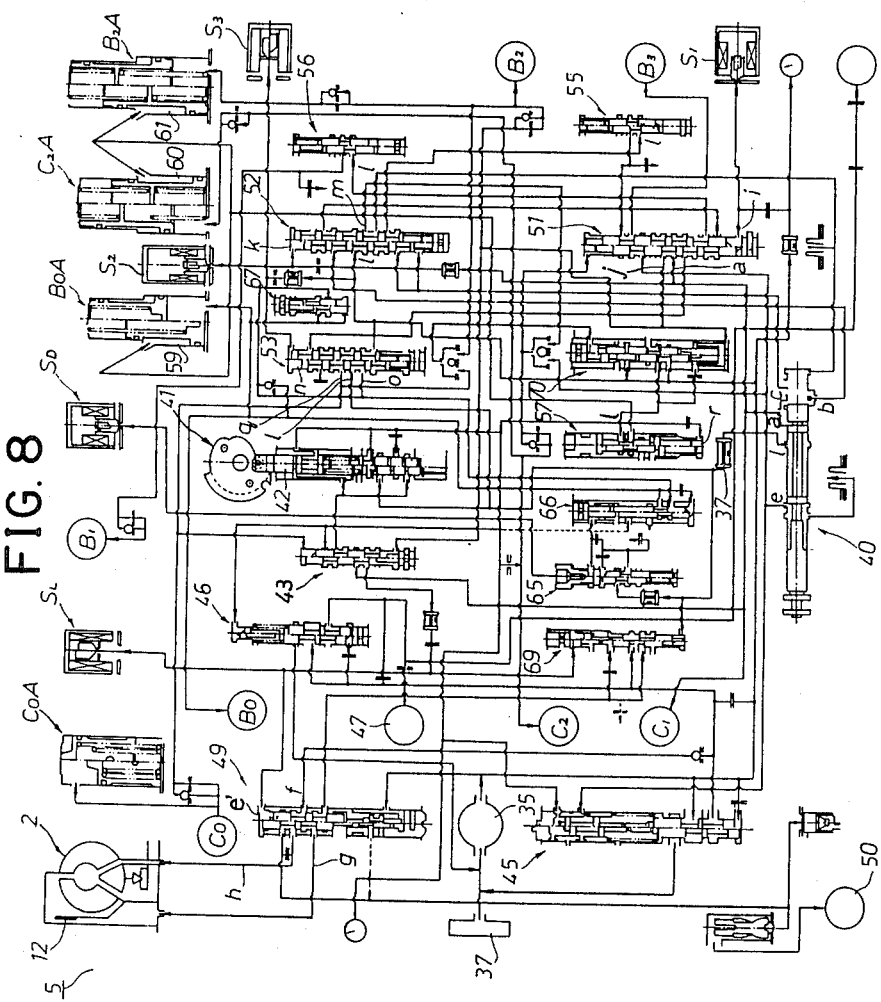
FIG. 8 is an overall illustration showing a hydraulic control mechanism.

On the other hand, the hydraulic shift control mechanism 5 comprises, as shown in FIG. 8, a number of valves, accumulators, orifices, filters, and the like. The respective valves will be described hereinafter. A manual valve 40 is shifted to the respective ranges of P, R, N, D, S and L by a shift lever, and respective oil passes a, b, c, d, and e are shifted respectively, as shown in FIG. 5. The oil pass l is fed with a line pressure. A throttle valve 41 has a down shift plug 42. A cam is rotated according to a stepping-on operation of an accelerator pedal to obtain a throttle pressure corresponding to the engine output. A cut-back valve 43 generates a cut-back pressure except in first speed, reverse, and P,N range. The cut-back pressure acts on the throttle valve 41 to decrease the throttle pressure. A primary regulator valve 45 is pressure controlled by the throttle pressure and generates a line pressure corresponding to a load. That is, when the load is high, the line pressure is increased to obtain an operation pressure of the clutches C . . . and brakes B . . . . On the other hand, when the load is low, the line pressure is controlled to be low. A secondary regulator valve 46 is pressure controlled by oil pressure from the primary regulator valve 45 and controls a converter oil pressure and lubricating oil pressure to be fed to the converter 2 and respective lubricating parts 47. A lock-up relay valve 49 is controlled by a solenoid valve $S_L$ and shifts the oil flow communicating with the lock-up clutch 12 and an oil cooler 50. That is, when the solenoid valve $S_L$ is turned on, an upper end oil chamber e' is subjected to the line pressure. Due to the foregoing, an oil path f of a converter pressure oil controlled by the secondary regulator valve 46 is shifted from a lock-up clutch off-oil pass g to an on-oil pass h and guides an off-oil pass g to a drain circuit. A first shift valve 51 is adapted to shift between first speed and second speed (first speed and third speed of the transmission 1 as a whole) of the main shifting unit 21 and is actuated by the solenoid valve $S_1$. That is, when the solenoid valve $S_1$ is turned off, an oil chamber i is subjected to the line pressure to block the line oil pressure pass a at D range, S range and L range of the manual valve 40. On the other hand, when the solenoid valve $S_1$ is turned on, the oil pass a communicates with an oil pass j to feed the line pressure to the brake $B_2$ and $B_2$ accumulator $B_2A$. A second shift valve 52 is adapted to shift between speed and third speed (third speed and fifth speed of the transmission as a whole) of the main shifting unit 21 and is actuated by the solenoid valve $S_2$. That is, when the solenoid valve $S_2$ is turned off, an oil chamber k is subjected to the line pressure to cause a line pressure oil pass l to communicate with an oil pass m so that the line pressure is fed to a direct clutch $C_2$ and $C_2$ accumulator $C_2A$. On the other hand, when the solenoid valve $S_2$ is turned on, the line pressure oil path l is blocked. A third shift valve 53 is adapted to shift the sub-shifting unit 16 and is actuated by the solenoid valve $S_3$. That is, when the solenoid valve $S_3$ is turned on, an oil chamber n is subjected to the line pressure to cause the line pressure oil path l to communicate with an oil path o, so that the line pressure is fed to the O/D brake $B_o$ and $B_o$ accumulator $B_oA$ through a $B_o$ release control valve 65 as will be described later. On the other hand, when the solenoid valve $S_3$ turned off, the line pressure oil path l communicates with an oil path q to feed the line pressure to an O/D direct clutch $C_o$ and $C_o$ accumulator $C_oA$. A first coast modulator valve 55 is adapted to control the line pressure of the oil path l fed from a port c through the second shift valve 52 to the coast modulator pressure at L range of the manual valve 40 and to feed the coast modulator pressure to first and Rev brakes $B_3$ through the first shift valve 51. A second coast modulator valve 56 is adapted to control the line pressure of the oil pass l fed from a port b through the second shift valve 52 and the first shift valve 51 to the coast modulator pressure at S range of the manual valve 40 and to feed the coast modulator pressure to the second brake $B_1$. The first accumulator control valve 57 feeds the throttle pressure to an oil chamber r, so that the line pressure l fed through a second accumulator control valve 70, as will be described later, is pressure controlled to the accumulator control pressure and the controlled pressure is fed to respective back pressure chambers 59, 60 and 61 of the $B_o$ accumulator $B_oA$, $C_2$ accumulator $C_2A$ and $B_2$ accumulator $B_2A$.

Furthermore, in addition to the above-mentioned respective hydraulic devices, the present hydraulic shift control mechanism 5 is provided with $S_D$ modulator valve 65, a $B_o$ release control valve 66, a $B_o$ sequence valve 67, a lock-up control valve 69 and a second accumulator control valve 70.

Figure 6:
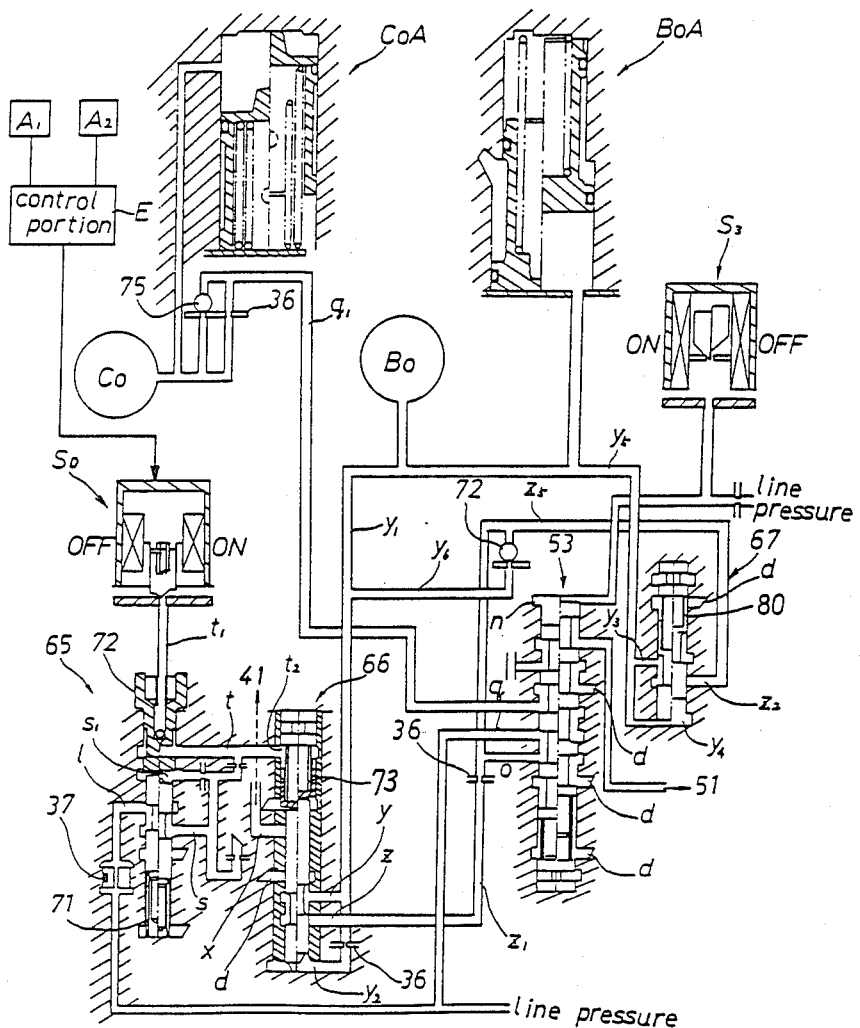
FIG. 6 is an illustration showing a main part of a hydraulic control mechanism in which the present invention is applied to a multistage transmission.
Figure 10:
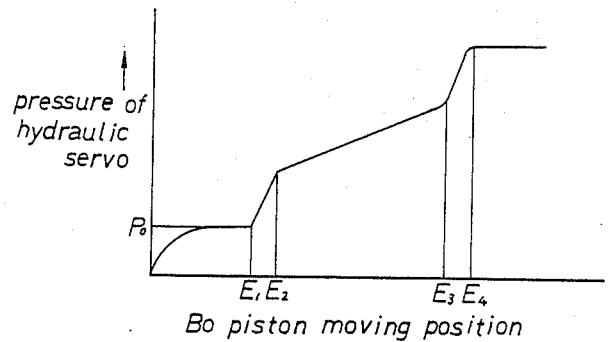
FIG. 10 is an illustration showing the operating state of an O/D brake.

The $S_D$ modulator valve 65 as shown in detail in FIG. 6, is fed with line pressure from the line pressure port l through the oil filter 37, and port l communicates with the upper end oil chamber $S_1$ through the oil pass s. The line pressure is controlled to a predetermined pressure (4 kg/cm$^2$, for example) due to the balancing of the feed back pressure acting on the oil chamber $s_1$ and a spring 71. In addition, the controlled solenoid modulator pressure is fed to an oil pass t. The oil pass t communicates with the solenoid valve $S_D$ through a plug 72 and an oil pass $t_1$ and also communicates with the $B_o$ release control valve 66. The control pressure due to on-off control or duty control of the solenoid valve $S_D$ is fed to an oil chamber $t_2$ to control the control valve 66. Although the solenoid valve $S_D$ is controlled by signals from the control portion E based on the rotary sensors $A_1$ and $A_2$, when the valve $S_D$ is on-off controlled, the throttle pressure is fed to an oil pass x to set a brake release pressure corresponding to a change of loads. A port y of the release control valve 66 communicates with the O/D brake $B_o$ and $B_o$ accumulator $B_oA$ through an oil pass $y_1$ and with a lower end oil chamber $y_2$ to exert feed back pressure thereto through the orifice 36. The brake $B_o$ and the accumulator $B_oA$ also communicate with a port $y_3$ of the sequence valve 67 through a by-pass $y_5$ and further with a lower end oil chamber $y_4$ of the valve 67 to exert feed back pressure thereto. Although the feed back pressure of the oil chamber $y_4$ is balanced with a spring 80 at the upper end thereof, the spring 80 is set to an initial operation pressure of the piston for causing the brake plates of the O/D brake $B_o$ to contact. Accordingly, the sequence valve 67 is held in the left half position until the initial operation pursurized and the pressure oil is fed to the O/D brake $B_o$ through the ports $z_2$ and $y_3$. When the feed back pressure exceeds the initial operation pressure, the sequence valve 67 is shifted to the right half position to block the ports $z_2$ and $y_3$. That is, as shown in FIG. 10, the brake plates of the brake $B_o$ do not contact until the piston assumes the moving position $E_1$. In $E_1$–$E_2$, the brake plates contact and start sliding, and in $E_2$–$E_3$, the contacting pressure is gradually increased while sliding, and in $E_3$–$E_4$, the brake plates are completely engaged. And, the spring 80 is set to the piston operation pressure (initial operation pressure) $P_o$ at the point $E_1$ where the brake plates start contacting. The port z of the control valve 66 communicates with a port o of the third shift valve 53 through an oil pass $z_1$ and the orifice 36. The port o communicates with a port $z_2$ of the $B_o$ sequence valve 67 through a by-pass $z_5$. An oil pass $y_6$ branched off from the oil pass $y_1$ communicates with the by-pass $z_5$ through a check valve 72. On the other hand, the third shift valve 53 communicates at its upper chamber n with the solenoid valve $S_3$ and the port l communicates with the line pressure. In addition, a port q communicates with the O/D direct clutch $C_o$ and $C_o$ accumulator $C_oA$ through an oil path $q_1$ and the orifice 36. The orifice 36 of the oil path $q_1$ is disposed parallel to a check valve for permitting the discharge of oil from the clutch $C_o$. In the figure, d denotes a drain port.

The lock-up control valve 69 operates when the sub-shifting unit 16 is in the O/D state even when the main shifting unit 21 is in first speed, i.e. when the transmission as a whole in more than second speed, to enable the lock-up, in addition to control the lock-up which the conventional main unit 21 has when it is in more than second speed. The second accumulator control valve 70 is adapted to decrease the pressure to be fed to the back pressure chambers 59, 60 and 61 of the accumulator $B_oA$, $C_2A$ and $B_2A$ to appropriate the braking capacity since the brake capacity of the main shifting unit becomes excessive, when main shifting unit 21 is up shifted with the sub-shifting unit 16 held in the O/D state, when compared to when the sub-shifting unit 16 is directly connected.

Next, the operation of the present embodiment will be described.

The respective solenoid valves $S_1$, $S_2$, $S_3$, $S_L$ and $S_D$, the respective clutches $C_o$, $C_1$, and $C_2$, the respective brakes $B_o$, $B_1$, $B_2$ and $B_3$, and the respective one-way clutches $F_o$, $F_1$ and $F_2$ of the multistage automatic transmission 1 according to the present embodiment are controlled at the shifting stages in the respective positions P, R, N, D, S and L as shown in an operation table of FIG. 9.

Figure 11:
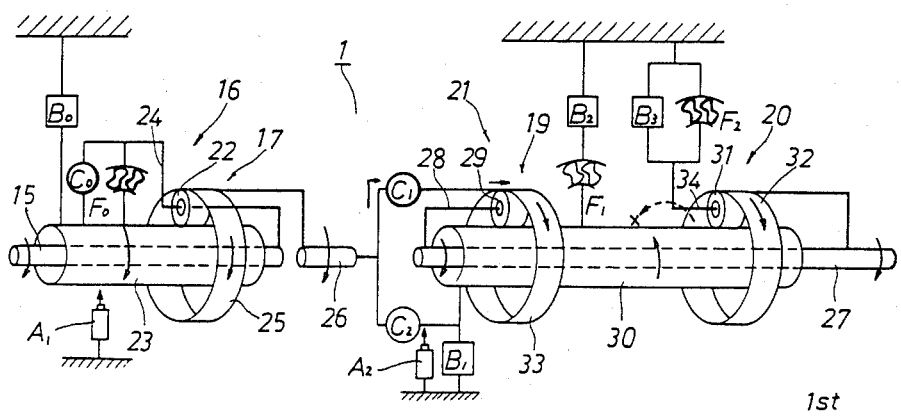
FIGS. 11 through 17 illustrate the operation of the automatic transmission in different operating states.

That is, when in first speed at D range or S range, as shown in FIG. 11, the O/D direct clutch $C_o$, one-way clutches $F_o$ and $F_2$ and forward clutch $C_1$ are engaged, and the other frictional engaging elements are held in the released state. Accordingly, in the sub-shifting unit 16, the planetary gear unit 17 is intergrated through the clutch $C_o$ and one-way clutch $F_o$ and held in the directly connected state, wherein rotation of the input shaft 15 is transmitted to the input shaft 26 of the main shifting unit 21 as is. In the main shifting unit 21, rotation of the main shaft 26 is transmitted to the ring gear 33 of the front planetary gear unit 19 through the clutch $C_1$, and further to the carrier 28 and the output shaft 27 integrally formed therewith. At the same time, a leftward rotating force is applied to the carrier 34 of the rear planetary gear unit 20 through the sun gear 30. However, the rotation is prevented by the one-way clutch $F_2$, and the planetary gear 31 is rotated about its own axis to transmit the power to the ring gear 32 integrally formed with the output shaft 27. That is, the main shifting unit 31 in the first speed state accompanied with the sub-shifting unit 16 in the directly connected state render a first speed state of the transmission as a whole. At this time, in the main shifting unit 21, the power is branched off through two routes; one to the output shaft 27 through the front planetary gear unit 19 and the other to the output shaft 27 through the rear planetary gear unit 20. Accordingly, loads received by the gears are dispersed to that extent.

When in second speed at D range and S range, as shown in FIG. 12, the O/D brake $B_o$, one-way clutch $F_2$ and forward clutch $C_1$ are engaged, and the other frictional engaging elements are in the released state. Accordingly, the sub-shifting unit 16 is locked to the sun gear 23 by the brake $B_o$, and the planetary gear 22 is rotated about it own axis while the carrier 24 is rotated to transmit the power to ring gear 25, and the speed-increasing rotation (O/D) is transmitted to the input shaft 26 of the main shifting unit 21. The main shifting unit 21 is the same as in the aforementioned first speed state. Accordingly, the first speed of the main shifting unit 21 accompanied with the speed-increasing rotation (O/D) of the sub-shifting unit 16 renders a second speed state of the transmission as a whole.

At this time, as shown in FIG. 6, the solenoid valve $S_3$ is turned on and the third shift valve 53 is fed at its upper oil chamber n with the line pressure and is shifted to the state shown in the left half of the figure. Then, the pressure oil within the clutch $C_o$ and $C_o$ accumulator $C_oA$ is discharged to the drain port d from the port q to release the clutch $C_o$. At the same time, the line pressure port l communicates with the port o. The line pressure from the port o is fed directly to the O/D brake $B_o$ through the by-pass $z_5$, ports $z_2$ and $y_3$ of the sequence valve 67 and by-pass $y_5$ up to the initial operating pressure of the $B_o$ piston. When the line pressure exceeds the $B_o$ piston initial operating pressure, the valve 67 is shifted to the right half position due to the feed back pressure in the oil chamber $y_4$. Thereafter, the line pressure from the port o is fed to the port z of the $B_o$ release control valve 66 through the orifice 36 and oil pass $z_1$. In the foregoing state, the control valve 66 is located in the left half position, and the port z communicates with the port y. Further, the line pressure is fed to the brake $B_o$ and $B_o$ accumulator $B_oA$ through the oil pass $y_1$ to engage the brake $B_o$.

When in third speed at D range, as shown in FIG. 13, the O/D clutch $C_o$, one-way clutch $F_o$, forward clutch $C_1$, one-way clutch $F_1$ and brake $B_2$ are engaged and the other frictional engaging elements are held in the released state. Accordingly, the sub-shifting unit 16 is in the directly connected state as mentioned before, and rotation of the input shaft 15 is transmitted to the input shaft 26 of the main shifting unit 21 as is. Although in the main shifting unit 21, rotation of the input shaft 26 is transmitted to the ring gear 33 of the front gear unit 19 through the clutch $C_1$ and to exert a leftward rotating force on the sun gear 30 through the planetary gear 29, the sun gear 30 is prevented from being rotated in that direction by the one-way clutch $F_1$ due to engagement of the brake $B_2$. Accordingly, the gear 29 causes the carrier 28 to be rotated while rotating about its own axis, and the second speed rotation is transmitted to the output shaft 27 through only the front gear unit 19. Due to the foregoing, the directly connected state of the sub-shifting unit 16 accompanied with second speed state of the main shifting unit 21 renders a third speed of the transmission 1 as a whole.

At this time, the solenoid valve $S_1$ is turned on to shift the first shift valve 51 to the left half position shown in FIG. 8 to cause the line pressure oil pass a to communicate with the port j, so that the line pressure is fed to the brake $B_2$ and accumulator $B_2A$. The shifting state of the main shifting unit 21, i.e. the change of the rotation of the sun gear 30 due to the foregoing is sensed by the rotary sensor $A_2$, and the $B_o$ release controlling solenoid valve $S_D$ is duty controlled (or on controlled) by receiving electric signals from the control portion E upon the start of a change in the rotation, so that the modulator pressure of the oil pass t is reduced. That is, although the $S_D$ modulator valve 65 feeds the line pressure in the line port l to the oil pass t after controlling the pressure by the spring 71 and the feed back pressure of the upper oil chamber $s_1$, the modulator pressure is reduced due to the duty control (or on control) of the solenoid valve $S_D$ and the pressure in the upper oil chamber $t_2$ of the $B_o$ release control valve 66 communicating with the oil pass t is also reduced. Accordingly, the control valve 66 is brought to the right half position shown in FIG. 6 while receiving the feed back pressure at the lower oil chamber $y_2$ thereof from the brake $B_o$, and the oil pressure from the brake $B_o$ and accumulator $B_oA$ is discharged to the drain port d through the oil pass $y_1$ and port y. Due to the foregoing, in the main shifting unit 21, the decrease in rotational speed of the sun gear 30 due to engagement of the brake $B_2$ is detected by the rotary sensor $A_2$. At the same time, in the sub-shifting unit 16, an increase in speed due to release of the brake $B_o$ is detected by the rotary sensor $A_1$. The solenoid valve $S_D$ is duty controlled by signals from the control portion E based on both the rotary sensors $A_1$ and $A_2$ to control the release pressure of the O/D brake $B_o$ and the the releasing operation of the O/D brake $B_o$ is synchronized with the engaging operation of the brake $B_2$. That is, when the speed of rotation of the sun gear 30 in the main shifting unit 21 is reduced upon engagement of the brake $B_2$, while the speed reducing state is sensed by the rotary sensor $A_2$ and at the same time the speed increasing state of the sun gear 23 in the sub-shifting unit 16 is sensed by the rotary sensor $A_1$, the solenoid valve $S_D$ is duty controlled to cause the O/D brake $B_o$ to effect a releasing operation, and to cause the sub-shifting brake $B_o$ to be completely released at the time when rotation of the sun gear 30 is stopped due to full engagement of the main shifting brake $B_2$, so that the shifting time of both the shifting units 16 and 21 will be synchronized. At this time, upon detection of the completion of the shifting of the main shifting unit 21, i.e., the stopping of rotation of the sun gear 30 as sensed by the rotary sensor $A_2$, the solenoid valve $S_3$ is turned off by electric signals from the control portion E to shift the third shift valve 53 to the right half position shown in FIG. 6. Then, the line pressure port l communicates with the port q, and the line pressure is fed to the clutch $C_o$ and $C_o$ accumulator $C_oA$ through the oil pass $q_1$ to engage the clutch $C_o$ and to cause the port o to communicate with the drain port d, so that pressurized oil of the O/D brake $B_o$ will be completely drained from the drain port d through the oil pass $y_6$, check valve 72, oil pass $z_5$ and port o to complete the shifting of the sub-shifting unit 16. In this way, the main shifting unit 21 and the sub-shifting unit 16 are operated in synchronism to obtain a smooth shifting.

Figure 14:
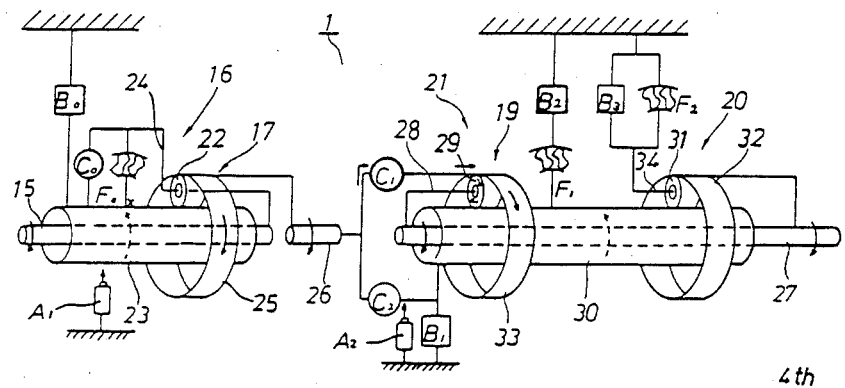

When in fourth speed at D range, as shown in FIG. 14, the O/D brake $B_o$, forward clutch $C_1$, brake $B_2$ and one-way clutch $F_1$ are engaged, and the other frictional engaging elements are held in the released state. Accordingly, the sub-shifting unit 16 is held in the speed increasing (O/D) state as mentioned before and the main shifting unit 21 is held in the second speed state, thus enabling fourth speed of the transmission 1 as a whole to be obtained.

Figure 15:
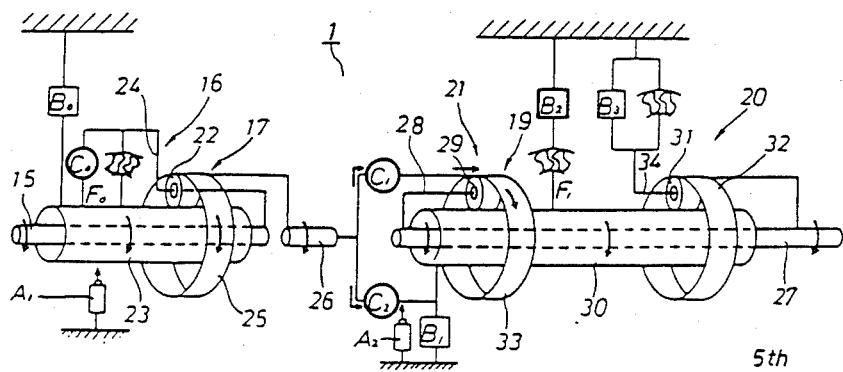

When in fifth speed at D range, as shown in FIG. 15, the O/D clutch $C_o$, one-way clutch $F_o$, forward clutch $C_1$, direct clutch $C_2$ and brake $B_2$ are engaged and the other frictional engaging elements are held in the released state. Accordingly, the sub-shifting unit 16 is held in the directly connected state as mentioned before. In the main shifting unit 21, the front planetary gear unit 19 is integrally formed due to engagement of the clutches $C_1$ and $C_2$, and rotation of the input shaft 26 is transmitted to the output shaft 27 as is. Due to the foregoing, the direct connection of the sub-shifting unit 16 accompanied with the three speed (direct connection) obtainable by the main shifting unit 21 enable five speeds of the transmission 1 as a whole to be obtained, wherein the input shaft 15 and output shaft 27 are integrally rotated.

At this time, as when shifting from second speed to third speed as mentioned before, while the shifting state of the main shifting unit 21 is sensed, i.e, the rotating speed of the sun gear 30 by the rotary sensor $A_2$, the $B_o$ release control valve 66 may be controlled by the solenoid valve $S_D$ according to signals from the control portion E based on the sensor $A_2$ to control the releasing state of the O/D brake $B_o$, and according to signals from both the rotary sensors $A_1$ and $A_2$, the solenoid valve $S_D$ may be controlled in such a manner as to shift the sub-shifting unit 16 in synchronism with the main shifting unit 21 by controlling the oil pressure in the brake $B_o$, and then, the solenoid valve $S_D$ may be turned off to complete the shifting to obtain a smooth shifting.

Figure 16:
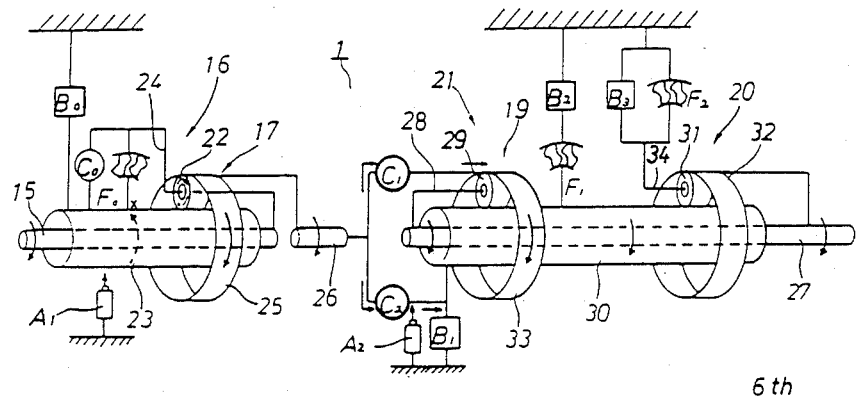

When in sixth speed at D range, as shown in FIG. 16, the O/D brake $B_o$, forward clutch $C_1$, direct clutch $C_2$ and brake $B_2$ are engaged, and the other frictional engaging elements are held in the released state. Accordingly, the sub-shifting unit 16 is held in the speed increasing (O/D) state as mentioned before and the main shifting unit 21 is held in the third speed state also as mentioned before. Both the shifting units 16 and 21 enable a sixth speed of the transmission 1 as a whole to be obtained.

Figure 17:
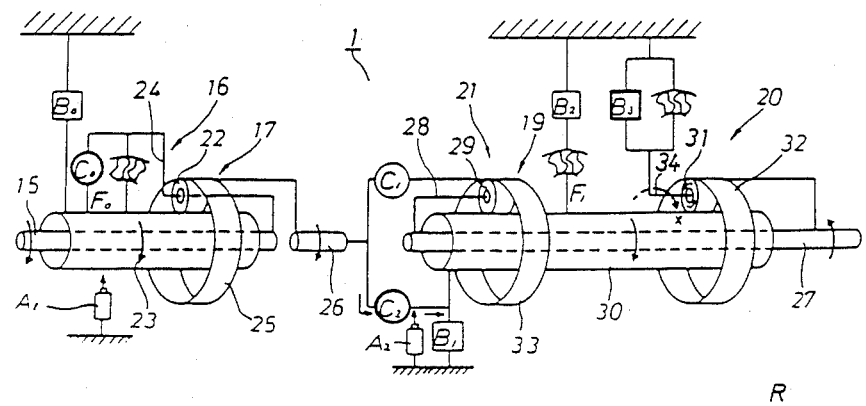

When in R range, as shown in FIG. 17, the O/D clutch $C_o$, one-way clutch $F_o$, direct clutch $C_2$ and brake $B_3$ are engaged, and the other frictional engaging elements are held in the released state. Accordingly, the sub-shifting unit 16 is held in the directly connected state, while the main shifting unit 21 is held in such a state that rotation of the input shaft 26 is directly transmitted to the sun gear 30 by the clutch $C_2$ and since rotation of the carrier 34 of the rear planetary gear unit 20 is locked by the brake $B_3$, the rotation of the sun gear 30 is transmitted as a reverse rotation through the rotation of the planetary gear 31 rotating about its own axis to cause the output shaft 27 to be rotated reversely.

When in third speed and fourth speed at S range or L range, the coast brake $B_1$ is engaged in the aforementioned third speed and fourth speed at D range (see FIGS. 13 and 14). Accordingly, rotation of the sun gear 30 is prevented in both directions, thus enabling an engine brake to be effected. At this time, in order to shift from second speed to third speed, as in D range, the solenoid valve $S_D$ is controlled to shift the sub-shifting unit 16 and main shifting unit 221 simultaneously.

When in first speed and second speed at L range, the brake $B_3$ is engaged in first speed and second speed at D range (see FIGS. 11 and 12). Accordingly, rotation of the carrier 34 of the rear planetary gear unit is prevented in both directions, thus enabling an engine brake to be effected.

On the other hand, as described above, when the transmission 1 as a whole is up shifted, when the sub-shifting unit 16 is to be increased in speed from direct connection to O/D, the main shifting unit 21 is not shifted, but when the transmission 1 is to be down shifted, there arises an instance in which the main shifting unit 21 is down shifted at the same time when the sub-shifting unit 16 is up shifted. For example, when the transmission as a whole is kicked down from third speed to second speed (see FIGS. 13 and 12), in the sub-shifting unit 16, the O/D clutch $C_o$ is released and the O/D brake $B_o$ is engaged, and the second brake $B_2$ is released in the main shifting unit 21. At this time, it takes more time to feed the operation pressure to the brake piston to engage the brake $B_o$ than to drain the operation pressure to release the $B_2$ brake. Since the two stage shifting operation is effected by merely shifting the shift valve 53, the $B_o$ sequence valve 67 works effectively. That is, as shown in FIG. 6, when the solenoid valve $S_3$ is turned on and the line pressure is fed to the oil chamber n of the third shift valve 53, the valve 53 is brought to be in the state as shown in the left half of FIG. 6. As a result, the line pressure port 1 communicates with the port o and the port q communicates with the drain port d. And, the pressure oil within the O/D clutch $C_o$ is drained to release the clutch $C_o$. On the other hand, when the shift valve 53 is shifted, the O/D brake $B_o$ is not subjected to the oil pressure. Accordingly, the $B_o$ sequence valve 67 is energized by the spring 80 and is held in the left half position. And, the ports $y_3$ and $z_2$ communicate with each other. In the foregoing state, the line pressure in the port o is fed to the O/D brake $B_o$ via the by-pass $z_5$, ports $z_2$, $y_2$ of $B_o$ sequence valve 67, and by-pass $y_5$ to gradually move the brake to the brake plate contacting position $E_1$ shown in FIG. 10. Then, the brake $B_o$ reaches the initial operation pressure, and the oil chamber $y_4$ is subjected to the feed back pressure comprising the operation pressure $P_o$ to shift the sequence valve 67 to the right half position to block the ports $y_3$ and $z_2$. Thereafter, the line pressure of the port o is transferred to the control valve 66 through the orifice 36 and oil pass $z_1$, and fed to the O/D brake $B_o$ and $B_o$ accumulator $B_oA$ through the ports z and y of the valve 66 held in the left half position and the oil pass $y_1$. Due to the foregoing, in order to coincide with the releasing operation of the brake $B_2$ due to the shifting of the first shift valve 51, the pressure oil is promptly fed to the O/D brake $B_o$ through the by-pass $z_5$, ports $z_2$ and $y_3$ and by-pass $y_5$ until the $B_o$ piston initial operation pressure $P_o$ is reached. When the brake starts engaging, the pressure is gradually fed at a predetermined flow rate through the orifice 36 to effect a smooth engagement. Since the releasing time of the second brake $B_2$ is concurrent with completion of the engagement of the O/D brake $B_o$ (the position $E_4$ in FIG. 10), the sub-shifting unit 16 and the main shifting unit 21 are shifted in synchronism with respect to each other.

In the above-mentioned embodiment, the rotary sensors $A_1$ and $A_2$ are provided to both of the sub-shifting unit 16 and main shifting unit 21 respectively and while sensing rotation of both the units, the solenoid valve $S_D$ is duty controlled to coincide with the shifting time. Alternatively, the rotary sensor $A_2$ may be provided to only the main shifting unit 21, and the solenoid valve $S_D$ may be on-off controlled according to rotation of the main shifting unit 21.

Further, in the above mentioned embodiment, there has been described a rear wheel drive longitudinal automatic transmission, wherein the sub-shifting unit 16 is disposed at the front stage and the main shifting unit 21 is disposed at the rear stage. However, the present invention may of course be applied to a front wheel drive transverse automatic transmission, wherein the main shifting unit is disposed at the front stage and the sub-shifting unit is disposed at the rear stage and comprises an underdrive planetary gear unit.

The effects of the above mentioned embodiments will be summarized as follow.

If the sequence valve 107 is controlled by the feed back pressure from the hydraulic servo 101, the shifting time of the sequence valve 107 can be predetermined using a simple constitution.

Further, if the sequence valve 107 is applied with the throttle pressure, the valve 107 can be controlled according to the opening degree of the throttle, i.e. output torque of the engine. Accordingly, a predetermined pressure of the hydraulic servo 101 can be corresponded to the output torque of the engine.

If the governor pressure is applied to the sequence valve 107, the valve 107 can be controlled according to vehicle speed. Accordingly, the predetermined pressure of the hydraulic servo can be corresponded to the vehicle speed.

If the sequence valve 107 is controlled by the solenoid valve, the valve 107 can be controlled according to signals from the control portion. Accordingly, the predetermined pressure of the hydraulic servo can be controlled precisely and flexibly in accordance with a travelling state, etc.

If a shift valve is used for the change-over valve 102, the shifting operation of the respective (predetermined) shifting stages can be promptly and smoothly effected.

Although the present invention has been described with reference to the preferred embodiment, the embodiment described herein is for illustrative purposes only and not in limitation thereof. Also, the scope of the present invention is defined in the appended claims and will not be bound by description of the embodiment. Accordingly, it will be understood that all changes and modifications which belong to the appended claims fall within the true spirit and scope of the present invention.

What is claimed is:

1. A hydraulic circuit for controlling an automatic transmission having a gear shift mechanism for outputting a plurality of speeds and a friction engaging element for selectively engaging a predetermined element of the gear shift mechanism, said hydraulic circuit comprising:
   a hydraulic servo for controlling said friction engaging element to selectively engage and disengage;
   a changeover valve operatively hydraulically connected to said hydraulic servo for selectively allowing oil under pressure to be fed and drained to and from the hydraulic servo respectively;
   an oil pass extending between said hydraulic servo and said changeover valve, and an orifice disposed in said oil pass;
   a bypass disposed in a parallel hydraulic relationship with respect to said oil pass and said orifice; and
   a sequence valve operatively hydraulically connected in the bypass for causing oil from the changeover valve to be fed to the hydraulic servo through said bypass until the oil pressure in the hydraulic servo reaches a first hydraulic servo pressure at which point the sequence valve is shifted to a second position in response to the hydraulic servo pressure, and for causing oil from the changeover valve to pass through the orifice disposed in said oil pass to said hydraulic servo when in said second position.

2. A hydraulic circuit as claimed in claim 1, wherein said changeover valve is a shift valve.

3. A hydraulic circuit for controlling an automatic transmission having a gear shift mechanism which includes a sub-shifting unit and a main shifting unit, and friction engaging elements selectively engageable for changing a force transmission path through said shifting units to facilitate multistage shifting of the gear shift mechanism which allows multiple speeds to be output by the transmission, said hydraulic circuit comprising:
   a hydraulic servo for controlling said friction engaging elements to selectively engage and disengage;
   an oil pass operatively hydraulically connected between said hydraulic servo and a control oil source from which oil is fed, and an orifice disposed in said oil pass;

a bypass disposed in a parallel hydraulic relationship with respect to said orifice; and a sequence valve operatively hydraulically connected in said bypass for causing oil fed from the control oil source to be fed to the hydraulic servo through said bypass until the oil pressure in the hydraulic servo reaches a first hydraulic servo pressure which is great enough to initially cause the hydraulic servo to control the friction engagement element to initiate engagement thereof at which point the sequence valve is shifted to a second position in response to the hydraulic servo pressure, and for causing oil from the control oil source to pass through the orifice disposed in said oil pass to said hydraulic servo when in said second position to smoothly increase the hydraulic servo pressure from said first hydraulic servo pressure for causing the friction engaging element to smoothly engage after initially engaging.

4. A hydraulic circuit as claimed in claim 3, wherein said one of said friction engaging elements is a friction engaging element of said sub-shifting unit, and the shifting of said sequence valve to said second position facilitates an up-shifting of said sub-shifting unit to be effected synchronously with a down-shifting of said main shifting unit.

5. A hydraulic circuit as claimed in claim 3, wherein said sub-shifting unit includes an overdrive planetary gear unit, said main shifting unit includes a front planetary gear unit and a rear planetary gear unit, and said one of said friction engaging elements is a brake of said overdrive planetary gear unit.

* * * * *